FIG-1

May 8, 1962  P. N. ARMSTRONG ET AL  3,034,102
DATA HANDLING SYSTEM

Filed Aug. 6, 1958  8 Sheets-Sheet 2

| ABCDEFGHIJK | ABCDEFGHIJK | |
|---|---|---|
| 4 7 1 5 2 7 2 3 6 9 8 | 2 4 1 2 5 7 3 6 7 9 8 | POSITION 1 |
| 2 7 1 5 4 7 2 3 6 9 8 | 1 4 2 2 5 7 3 6 7 9 8 | " 2 |
| 2 7 1 5 4 7 2 3 6 9 8 | 1 2 2 4 5 7 3 6 7 9 8 | " 3 |
| 2 7 1 5 4 7 2 3 6 9 8 | 1 2 2 4 5 7 3 6 7 9 8 | " 4 |
| 2 7 1 3 4 7 2 5 6 9 8 | 1 2 2 4 5 7 3 6 7 9 8 | " 5 |
| 2 4 1 3 6 7 2 5 7 9 8 | 1 2 2 3 4 7 5 6 7 9 8 | " 6 |
| 2 4 1 3 6 7 2 5 7 9 8 | 1 2 2 3 4 6 5 7 7 9 8 | " 7 |
| 2 4 1 3 6 7 2 5 7 9 8 | 1 2 2 3 4 6 5 7 7 9 8 | " 8 |
| 2 4 1 2 6 7 3 5 7 9 8 | 1 2 2 3 4 5 6 7 7 9 8 | " 9 |
| 2 4 1 2 5 7 3 6 7 9 8 | 1 2 2 3 4 5 6 7 7 9 8 | " 10 |
| 2 4 1 2 5 7 3 6 7 9 8 | 1 2 2 3 4 5 6 7 7 9 8 | " 11 |
|  | 1 2 2 3 4 5 6 7 7 8 9 | " 12 |

ABCDEFG

```
          7413265 ———————— POSITION  1
          7413265 ————————————————  2
          3417265 ————————————————  3
          3417265 ————————————————  4
          3217465 ————————————————  5
          3217465 ————————————————  6
          1237465 ————————————————  7
          1237465 ————————————————  8
          1235467 ————————————————  9
          1235467 ———————————————— 10
          1235467 ———————————————— 11
          1235467 ———————————————— 12
          1235467 ———————————————— 13
          1235467 ———————————————— 14
          1234567 ———————————————— 15
          1234567 ———————————————— 16
          1234567 ———————————————— 17
          1234567 ———————————————— 18
          1234567 ———————————————— 19
```

FIG. 6.

ABCDEFGHIJK

```
       471 52723698 ———————— POSITION  1
       271 54723698 ————————————————  2
       271 54723698 ————————————————  3
       271 54723698 ————————————————  4
       271 34725698 ————————————————  5
       241 36725798 ————————————————  6
       142 36725798 ————————————————  7
       122 36745798 ————————————————  8
       122 35746798 ————————————————  9
       122 35746798 ———————————————— 10
       122 34756798 ———————————————— 11
       122 34657798 ———————————————— 12
       122 34567798 ———————————————— 13
       122 34567798 ———————————————— 14
       122 34567798 ———————————————— 15
       122 34567798 ———————————————— 16
       122 34567789 ———————————————— 17
```

FIG_7

FIG_8

FIG-11

FIG_12.

FIG_13.

United States Patent Office

3,034,102
Patented May 8, 1962

3,034,102
DATA HANDLING SYSTEM
Philip N. Armstrong, Santa Monica, Calif., Mitchell P. Marcus, Johnson City, N.Y., and Raymond J. Nelson, Cleveland, Ohio, assignors to International Business Machines Corporation, New York, N.Y., a corporation of New York
Filed Aug. 6, 1958, Ser. No. 753,441
6 Claims. (Cl. 340—172.5)

This invention relates in general to a system for handling a plurality of randomly arranged character data, and in particular to a data handling system for sorting a file of randomly stored record blocks of character data in a predetermined ordered sequence.

It is well recognized that sorting is a basic procedure in business and scientific data processing because it facilitates ready reference to any single item in a large file of information, and makes possible the collation of one file of data with another. Notwithstanding the fact that there are several sorting techniques now known for manipulating items of information into a predetermined ordered sequence, one of the most acute problems at the present time with regard to the efficient utilization of apparatus for providing a data processing operation, is that of sorting a large tape file of many groups, i.e., record blocks, of data. In line with the foregoing, most sorting techniques which can be accommodated by an electronic computer system, for example, require extensive programming as well as a considerable amount of expensive computer time. Furthermore, other sorting techniques which do not require excessive computer time do, however, make it necessary that additional data storage equipment, such as several magnetic tapes for example, be utilized.

The present invention is directed to the alleviation of this data sorting problem, and has for its broad object the provision of an improved data handling system. In line with the foregoing, another broad object of this invention is to provide an improved sorting system for arranging randomly recorded information in a predetermined ordered sequence.

Another object of this invention is to provide an improved tape file sorting system which is faster operating, more efficient and less expensive than any known heretofore.

The illustrative embodiment of the present invention is a multihead, off-line, magnetic tape sorter system which does not require programming and which efficiently arranges a file of record blocks each of which includes at least one character data, in a predetermined ordered sequence. Briefly described, this sorter system is one wherein a plurality of pairs of associated read and write magnetic heads are arranged in operating relationship to a magnetic tape file whereon a plurality of randomly arranged record blocks are stored. Furthermore, these pairs of magnetic heads are spaced in accordance with an arithmetic progression which is defined by the spacing of equal length record blocks stored on the tape file. This arithmetic progression can be defined by the expression "$a, a+d, a+2d \ldots a+nd$," wherein "$a$" and "$d$" are each integers 1 indicative of a tape file distance that is defined by the spacing between equal length record blocks. Thus, as the magnetic tape file is advanced relative to the aforesaid pairs of tape file information operating heads, a plurality of stored character data are read simultaneously from the tape file through the arithmetically spaced heads into a so-called data compare-sort apparatus. The signals representing these character data are dispatched through the compare-sort apparatus to the output thereof so that they appear simultaneously thereat on a plurality of separate electrical lines designated high to low data according to their relative magnitude. That is, these "high to low" data appear on their respective high to low lines so that they are rerecorded onto the magnetic tape file in a predetermined ordered sequence by certain select write heads.

Thus, according to the basic concept of the present invention, randomly provided input information from a plurality of data sources is dispatched through a data compare-sort apparatus which is operatively connected to pairs of associated information handling elements arranged in an arithmetic progression with respect to the spacing of the information in information memory. Accordingly, another object of this invention is to provide apparatus capable of operating in accordance with this concept.

Another object of this invention is to provide a sorting system which utilizes a single magnetic tape file for first providing the randomly arranged input information required to be sorted, and then storing the sorted information as it is rerecorded thereon in a predetermined ordered sequence.

Referring once again to the illustrative embodiment of the present invention, if a sufficient number "H" of magnetic read-write heads is arranged in an arithmetic progression with respect to the "R" record blocks stored randomly on the tape file so as to satisfy the inequality $$H \geq \frac{1+\sqrt{8R-7}}{2}$$

wherein "H" is the least integer equal to or greater than the right-hand term, the randomly arranged record blocks can be rerecorded on the tape file in an ascending ordered sequence, during a single pass of the tape file.

Another object of this invention is to provide an improved system for selectively sorting randomly recorded items of data by exchanging the positions of certain ones of these items which are not in the desired predetermined ordered sequence.

Still another object of this invention is to provide a data handling system for sorting record blocks, wherein said system includes a memory whereon record blocks of at least a single character data length are stored and related pairs of character data read-write elements arranged in an arithmetic progression with respect to the record block spacing. In line with the foregoing object, another object of this invention is to provide such a system having $$H \geq \frac{1+\sqrt{8R-7}}{2}$$

pairs of read-write elements so as to rearrange and sort the record blocks durnig a single pass of a tape file.

Other objects of the invention will be pointed out in the following description and claims and illustrated in the accompanying drawings, which disclose, by way of examples, the principle of the invention and the best mode, which has been contemplated, of applying that principle.

Definitions

Prior to describing the present invention in detail, it is deemed advisable to define certain terms which are to be used throughout this specification, as follows:

(1) A memory is any device into which information can be introduced and then extracted at a later time. Thus, a few such devices may be specified as magnetic tapes, magnetic drums, electrostatic storage elements, and magnetic core registers.

Figure 3:
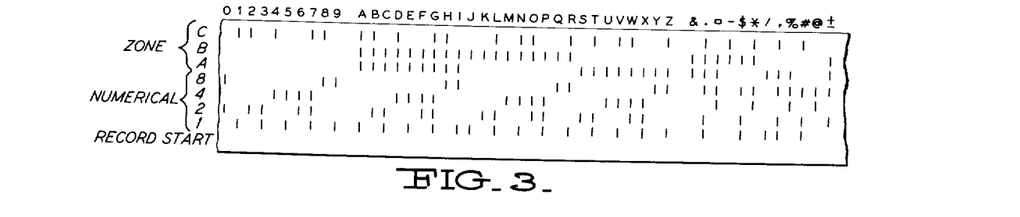
FIG. 3 illustrates the parallel-by-bit character data code as recorded on a tape file.

(2) A character data is a set of elementary symbols, binary or otherwise, which may be arranged in ordered aggregates to express information. Thus, as shown in FIG. 3, the various character data employed in the illustrative embodiment of the present invention are various combinations of the binary coded 1, 2, 4, 8, A, B, C bits, or character datum, for expressing numeric, alphabetic and special character symbols. Accordingly, the set of binary bits 1, A, B and C is representative of the character data "A." On the other hand, the alphabetic symbol "A" is defined by the 1, A, B and C character datum.

Figure 1:
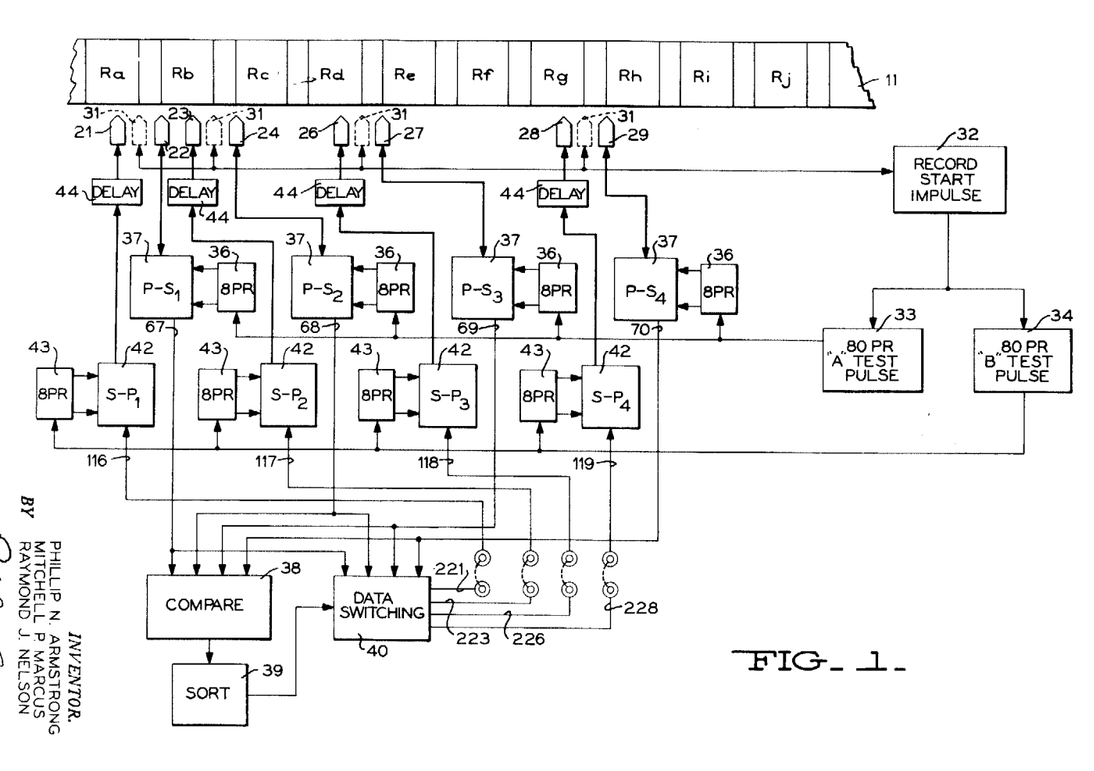
FIG. 1 is a block diagram of the illustrative and preferred embodiment of the present invention.

(3) Character data read-write elements includes those devices required to read and to write, respectively, individual sets of elementary symbols expressing information. Thus, a character data read device, e.g., the device 22, as employed in the system of FIG. 1 to read the code illustrated in FIG. 3, would require seven parallel magnetic bit, or character datum, read heads. It should be clear that the seven character datum read heads are shown in FIG. 1 as single character data read device so as to avoid undue and unnecessary complexity.

(4) A record block is defined as a group of character data which are to be considered as a unit, and accordingly, a record block must include at least a single character data. Furthermore, fixed length record blocks must each include a similar number of character data positions. In this connection, the fixed length record blocks Ra–Rj (FIG. 1) are of equal length since each record block includes eighty serially ordered character data positions.

(5) The expression for the arithmetic progression "$a, a+d, a+2d \ldots a+nd$" referred to hereinbefore, wherein the symbols "$a$" and "$d$" are each representative of the integer 1 which is indicative of the equal spacing between two adjacent record blocks, is intended to signify that a plurality of character datum are read simultaneously from a plurality of record blocks. In the preferred sorting system embodiment, character data are read simultaneously from a plurality of spaced record blocks. Thus, for example, the first two, i.e., Nos. 1 and 2, character data read devices are separated by spacing from one record block to the next, whereas the second two, i.e., Nos. 2 and 3, character data read devices are spaced a distance by two record blocks. The next two, i.e., Nos. 3 and 4, character data read devices are spaced apart by three record block lengths, etc., so that the last set of character data read devices would be spaced apart a distance defined by "$n$" record blocks.

General Description

As stated previously, the illustrative and preferred embodiment of the present invention relates to a data handling system which includes a magnetic tape file and apparatus associated therewith for rearranging the character data originally randomly recorded on the tape file, in a predetermined ascending ordered sequence. Referring to FIG. 1, a magnetic tape file 11 (see also FIG. 2) is employed as a memory for a plurality of equal length record blocks Ra–Rj which are also equally spaced. For purposes of this specification, each of the record blocks includes eighty serially ordered, parallel-by-bit, character data in a distance of one inch of the tape file 11. In keeping with the binary coded character data for numeric, alphabetic and special character symbols that are shown in FIG. 3, the numeric value, for example, "1" is represented by a binary 1 bit in the 1 position of the tape channels, or character datum, whereas the alphabetic character "A" is represented by the parallel tape recorded 1, A, B and C binary 1 bits. Similarly, the special character "$" is represented by the 1, 2, 8 and B binary 1 bits, whereas the blank character is represented by an absence of all binary 1 bits in a character data position. It is understood that binary "0's" are recorded in each location where no binary "1" bits are recorded.

The tape file 11 (FIGS. 1 and 2) is advanced past the pairs of associated character data read-write heads 12–15, which pairs thereof are spaced according to the aforestated arithmetic progression, by conventional sprocket tape drive means 16—17, so that the tape file 11 is advanced at a constant rate of speed from supply reel 18 to take-up reel 19.

Figure 2:
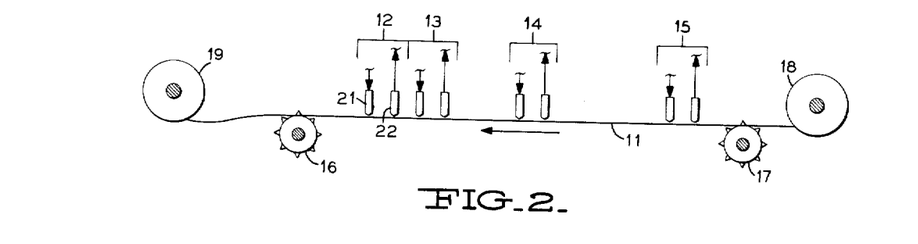
FIG. 2 illustrates the arrangement of the tape file with respect to the pairs of character data read-write elements of the illustrative embodiment shown in FIG. 1.

Each of the pairs of associated character data read-write heads includes seven respective read and write heads, one for each of the parallel bit designations on tape file 11 (see also FIG. 3). Thus, the pair of associated read-write heads designated by the reference numeral 12 in FIG. 2, includes seven parallel character datum write heads 21 (only one of which is shown for the sake of simplicity) and seven corresponding read heads 22. Only four pairs of associated character data read-write heads are shown in the illustrative embodiment of this invention to avoid undue complexity. It must, of course, be understood that any number of pairs of associated read-write devices may be used so long as they are spaced in the arithmetic progression. Hence, the four pair thereof shown in FIGS. 1 and 2 are not to be construed as a limitation.

Referring to FIG. 1, immediately prior to the time that the first serially ordered, parallel-by-bit, character data of a first record block, such as record block Rb for example, is moved in operating relationship with respect to a character data reading device, such as the seven parallel character datum read heads represented by the reference numeral 22 for example, a tape recorded record start bit is read by any one or more of the read heads 31 arranged in alignment with the similarly designated channel shown in FIG. 3. Thereupon, a record start signal is applied simultaneously from the record start circuit apparatus 32 to a pair of "A" and "B" 80-point test pulse rings 33 and 34 of conventional design. The timing of a "B" pulse is such as to occur between two succeeding "A" pulses. The first "A" pulse is timed with respect to the tape file movement to be applied simultaneously to four 8-point rings 36 just as the first character data in each of four respective record blocks is moved past a corresponding one of the character data read devices 22, 24, 27 and 29. Thus, during the time defined by the first point of the eight successively appearing signals from 8-point ring 36, parallel-by-bit character data defining signals will be applied from each of the aforesaid character datum read heads to an associated parallel-by-bit to serial-by-bit (P to S) translating static register 37. During a time defined by the next following seven points of ring 36, the parallel-by-bit character data stored in each of the "P to S" registers 37, are read out therefrom in serial-by-bit fashion, high order first. This plurality of serial-by-bit character data defining signals are applied simultaneously over the separate parallel lines 67–70 from their respective registers 37 to the compare device 38 of a four-way data compare-sort apparatus which is comprised of the devices 38–40. These will be defined in detail hereinafter. These simultaneously entered character data defining signals are compared on a bit-by-bit, or character datum by character datum, basis in order to determine their relative magnitudes, so that each of the plurality of character data being compared and sorted appear simultaneously on the relative magnitude weighted output lines 221, 223, 226 and 228, and thence through the pluggable connections shown to the lines 116–119 of the data switching device 40 in a predetermined ascending ordered sequence. That is, the character data of the lowest relative magnitude (LO) is applied via line 116 from the data switching device 40 to the serial-by-bit to parallel-by-bit (S to P) translating static register 42 associated with the first character data write device 21. The next highest (2nd HI) character data defining signals are applied via line 117 to the register 42 associated with the next following character data write device 23. Similarly, the third highest (3rd HI) character data defining signals are applied via line 118 to the register 42 associated with the third character data write device 26, whereas the signals defining the character data of highest relative magnitude (HI) are applied via line 119 to the register 42 which is associated with the character data write device 28. Thus, four simultaneously applied character data which according to their respective relative magnitudes appear simultaneously in a random fashion along lines 67–70, are each caused to appear simultaneously along one of the lines 116–119 in accordance with their relative magnitude standings.

As is shown in FIG. 1, operation of each of the static register 42 is governed by a respective 8-point ring 43 which is similar to ring 36. Each of the rings 43 is started on its 8-point cycle by the application of a "B" test pulse from the apparatus 34. During a time defined by the first seven points that the ring 43 is operated, the serial-by-bit defined character data appearing at the output of data switching device 40 is applied therefrom via the lines 116–119 to their respective registers 42 in timed sequence with the pulse operation of these rings. During the eighth point of operation of a ring 43, the already stored serial-by-bit character data in a "S to P" register 42, is read out therefrom in parallel-by-bit form to a respective one of the character data write device delay units 44. The data entered into each of the units 44 is stored therein until the section of the tape file 11 from which the character data to be recorded were originally read, is moved relative to a character data write device, such as device 28 for example.

Thus, it may be stated in summation that consequent upon each of the eighty character data positions in any given record block being moved past a particular character data read device, i.e., seven parallel character datum read heads, these data are first translated from a parallel-by-bit form to serial-by-bit form, after which they are applied simultaneously to the four-way data compare-sort apparatus 38–40. As a result, the character data defining signals are rearranged and caused to appear simultaneously on the output lines 116–119 thereof in a predetermined ascending ordered sequence. These rearranged character data are applied to their respective "S to P" registers 42 whereat they are translated from serial-by-bit form to parallel-by-bit form prior to being stored for a required length of time in a respective delay unit 44, after which they are rerecorded in the predetermined ascending ordered sequence on tape file 11.

Character Data Compare-Sort Apparatus

As will be brought out shortly, the operation of the four-way data compare-sort apparatus 38–40 is such as to sort all of the serially ordered character data in any given record block similarly to the sort afforded by the first unmatched character data in the record block with respect to correspondingly timed character data in other record blocks. Thus, for example, if the first character data of record block Ra (FIG. 1) as read by character data read device 22 is high with respect to the first character data in record block Rb, the so-called memory apparatus 772 (FIG. 7) of the data compare-sort apparatus 38–40 will be operated to latch-connect lines 67 and 68 to lines 117 and 116, respectively, for the remainder of the record block. Accordingly, the remaining seventy-nine serially ordered character data in each of these record blocks will be routed similarly and in accordance with the initial relative magnitude determination for the first unmatched character data. At the end of the record block, the aforementioned memory apparatus is disabled by a reset signal in preparation for the next record block sort.

Figure 7:
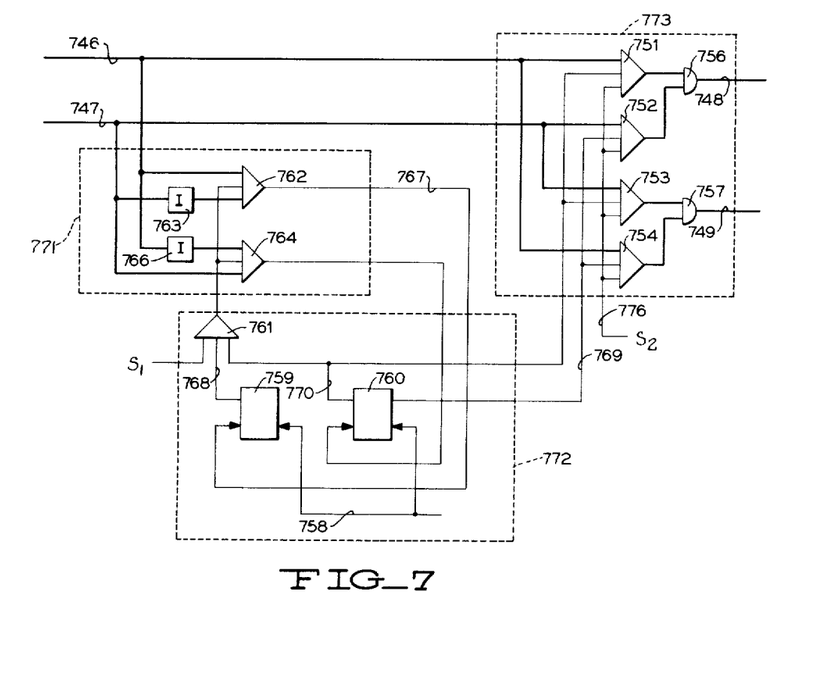
FIG. 7 is a wiring diagram of a two-way data compare-sort apparatus.

*Two-way data compare-sort apparatus.*—This apparatus is disclosed and claimed in the copending M. Marcus patent application, Serial No. 753,443, filed on August 6, 1958. Referring to FIG. 7, apparatus is shown whereby binary valued, i.e., two valued, signals appearing along so-called primary and secondary data input lines 746 and 747, respectively, are normally dispatched onto their respective associated high and low character data output lines 748 and 749. That is, the primary input data will normally appear on the high data output line 748 via the AND gate 751, whereas the secondary data will normally appear on the low data output line 748 via the AND gate 753. In the event that a binary valued, serially ordered, high order first, secondary data signal appears on line 747 which is of greater relative magnitude than the corresponding primary data signal on line 746, the secondary input data will be caused to appear on the high output line 748 via AND circuit 752, whereas the primary input data will be caused to appear on the low output line 749 via the AND gate 754. Furthermore, as stated previously, the operation of the so-called memory portion 772 of the apparatus shown in FIG. 7, is such as to latch-connect the primary input line 746 to the low data output line 749 and the secondary input line 747 to the high data output line 748. Thus, all of the succeeding character data signals appearing on input lines 746 and 747 will be sorted in accordance with the relative magnitude determination for the first unmatched character data in given record blocks until the memory apparatus 772 is reset. Similarly, in response to the first unmatched character data condition wherein the primary input data signal is of higher relative magnitude than a secondary input data signal, the apparatus shown in FIG. 7 will be so latch-connected as to cause the primary and secondary input lines 746 and 747, respectively, to be connected to the high and low output data lines 748 and 749, respectively, for a predetermined time until a reset signal is applied to line 758.

*Operation of the two-way data compare-sort apparatus when the primary character data are of higher relative magnitude than a corresponding secondary character data.*—At a predetermined time, such as the end of each record block for example, a timed reset signal is applied to the reset line 758 associated with triggers 759 and 760 in order to turn these triggers Off. So long as these triggers 759 and 760 are Off, positive signals are applied to their respective AND gates 751, 753 and 761 via their respective output lines 768 and 770. Whenever trigger 760 is turned On in a manner to be described shortly, positive signals are applied only to AND gates 752 and 754 via line 769. Furthermore, the positive signal applied to AND gate 761 during the time trigger 759 is Off is removed therefrom when this trigger is turned On, as will also be described shortly.

Figure 8:
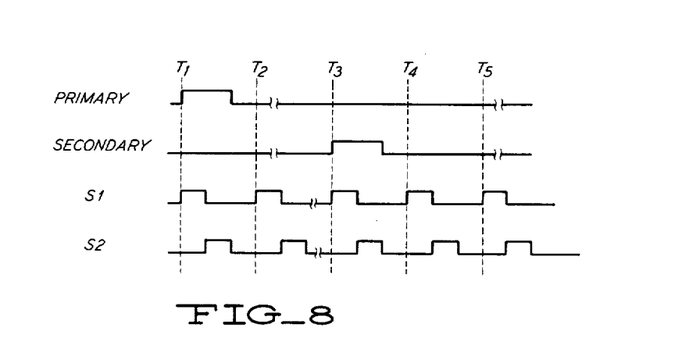
FIG. 8 is a timing chart of signals applicable to the apparatus of FIG. 7.

Let it be assumed that the first unmatched, serially ordered, binary valued, character datum signal occurs at time T1 (see also FIG. 8), and is one wherein the primary data input line 746 is at a positive potential while the secondary data input line 747 is at a less positive potential and, in fact, is preferably at a zero or negative potential. For the purpose of this specification, the one of two valued signals which is not positive will be referred to as negative. At the instant T1 that the primary line 746 is positive and the secondary input line 747 is negative, all of the three inputs to AND gate 762 in comparing apparatus 771 will be at a positive potential. As may be seen in FIG. 7, this is due to the fact that the negative secondary input line signal is inverted by the inverter 763, while the output of AND gate 761 is positive due to sample pulse S1 at time T1 since both of the triggers 759 and 760 are still Off, having been reset prior to time T1. Thus, at time T1, a positive signal will appear at the output of AND gate 762 and will be applied to trigger 759 via line 767, to thereby turn the said trigger On. This, of course, will immediately cause a negative signal to be applied to the center input leg to AND gate 761 so as to remove the positive signal output therefrom to both of the AND gates 762 and 764. Since trigger 759 will remain in an On condition until a reset signal is applied thereto along line 758, a positive signal cannot appear along the output lines of the AND gates 762 and 764 until trigger 759 is reset Off. Hence, the two-way data compare-sort apparatus shown in FIG. 7 is caused to be latch-connected until trigger 759 is turned Off in such a manner that all of the primary input data signals along line 746 will be dispatched via AND gate 751 and OR gate 756 to the high data output line 748, whereas all of the secondary input data signals along input line 747 will be dispatched via AND gate 753 and OR gate 757 to the low data output line 749. As is evident from an examination of FIGS. 7 and 8, these character data signals are gated by the data switching apparatus 773 in timed relation with the application of the sample signal S2 pulses on line 776.

*Operation of two-way data compare-sort apparatus in response to high secondary character data input signal.*— When a positive signal is caused to appear along secondary input line 747 while a corresponding negative signal is caused to appear along primary input line 747, all of the input signals to AND gate 764 will be positive only if this represents the first unmatched data condition following the reset of triggers 759 and 760. Thus, if it is assumed that a reset pulse is applied to line 758 (FIG. 7) immediately prior to time T3 (see FIG. 8), the afore-stated condition will exist. All of the inputs to AND gate 764 will be positive at time T3 because (*a*) the negative primary input signal is applied as a positive one by inverter 766 to one leg of the input to AND gate 764, and (*b*) so long as both triggers 759 and 760 are turned Off the output of AND gate 761 due to sample pulse S1 at time T3 is positive. Thus, consequent upon all three of the inputs to AND gate 764 being positive, a positive potential output therefrom is applied to trigger 760 so as to turn the said trigger On. As stated previously, when trigger 760 is turned On, a positive signal is applied to the inputs of AND gates 752 and 754 via line 769, whereas the positive signal previously applied to the inputs of AND gates 751, 763 and 761 via line 770 is removed. It should be clear that since one of the inputs, i.e., the one on line 770, to AND gate 761 is negative, the inputs to AND gates 762 and 764 which are connected to the output of gate 761 will also be negative. This condition will persist until the trigger 760 is caused to be reset Off by the timing pulse applied to line 758. As a result of the operation of trigger 760 whereby the same is in an On condition, the apparatus shown in FIG. 7 will be latch-connected so that all primary character data signals appearing on line 746 will be dispatched to the low data output line 749 via AND gate 754 and OR gate 757. Similarly, all of the secondary character data signals appearing on input line 747 during the latter-mentioned latch connect condition, will be dispatched to the high data output line 748 via AND gate 752 and OR gate 756. Since the AND gates 752 and 754 are each conditioned to pass positive signals, as long as trigger 760 is maintained On, and since trigger 760 once having been turned On is not reset until a predetermined time, such as the end of a record block for example, all of the primary and the secondary character data signals appearing along their respective input lines 746 and 747 will appear along the low and high data output lines 749 and 748, respectively.

*Operation summary of two-way data compare-sort apparatus.*—In summation, the operation of this apparatus shown in FIG. 7 is such that while the serially ordered primary and the secondary character datum signals are equal, or matched, the primary and the secondary character data signals will be dispatched to the high and the low data output lines, respectively, so long, however, as there has not been an unmatched data condition detected subsequent to the last reset operation of triggers 759 and 760. In response to the first unmatched character datum condition following the reset of these triggers, wherein the primary character data is high with respect to a corresponding secondary character data, the apparatus shown in FIG. 7 is caused to be latch-connected. Thus, for a predetermined period determined by the frequency of the afore-mentioned trigger 759—760 reset signals, all of the successively applied primary and the secondary character data signals will be caused to appear on the high and the low output lines, respectively. If this predetermined time period is defined by the time required to move a record block length past any given character data device, it should be clear that the record blocks may be of any length, i.e., to accommodate one or more character data positions each, so long as they are of equal length. Thus, for example, a record block may include only a single character data, or, as stated previously in connection with the tape file 11 shown in FIG. 1, the record block would include eighty serially ordered character data. In response to the initial unmatched data condition wherein the relative magnitude of a secondary character datum signal is higher than the correspondingly timed primary character datum signal, the aforesaid apparatus is caused to be latch-connected so that the primary and the secondary character data are dispatched to the low and the high output lines, respectively, until the next reset of triggers 759 and 760.

*Four-way data compare-sort apparatus—general.*— Two embodiments of this apparatus which can handle four simultaneous binary valued data inputs, are shown and described in the present specification. The one embodiment shown in FIG. 12 hereof, utilizes five two-way data compart-sort apparatuses of the type just described hereinabove in connection with FIG. 7, so as to rearrange four simultaneously provided character data which are randomly applied to the lines 171–174 (FIG. 12), in a predetermined ascending ordered sequence with regard to the lines 81–84. Thus, whichever of the binary valued character datum signals applied to any one of the input lines 171–174 is initially high, will be dispatched via the arrangement of the two-way data compare-sort apparatuses 76–78 to the high character data output line 81. Similarly, whichever of these simultaneously provided input character datum signals along any of the lines 171–174 is low, will be dispatched via the apparatuses 76, 77 and 79 to the low character data output line 82. The second high and the third high character datum signals applied to two of the lines 171-174 will be dispatched therefrom via one or more of the two-way compare-sort apparatuses 76–80 to the "2nd HI" and "3rd HI" output lines 83 and 84, respectively.

Figure 12:
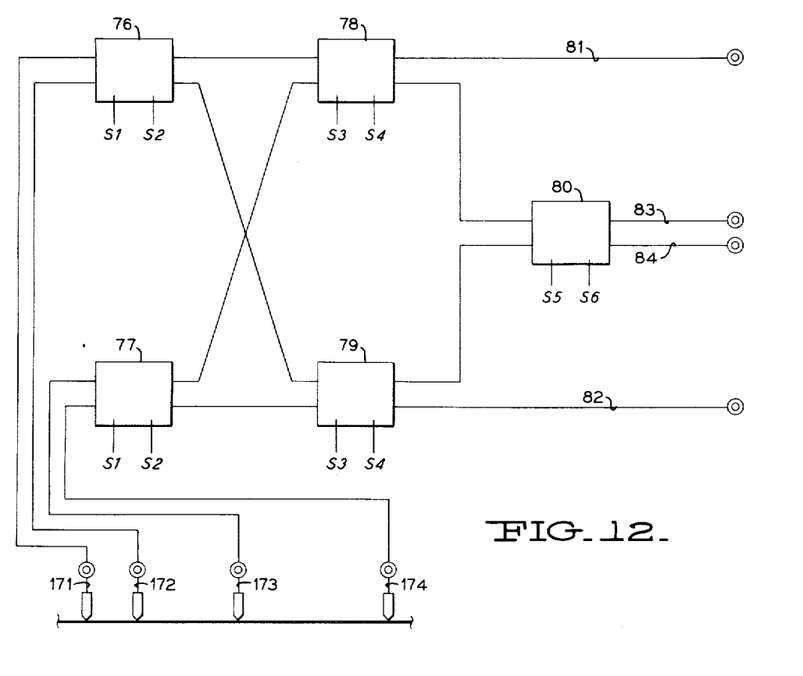
FIG. 12 is a block diagram of another four-way data compare-sort apparatus which is adaptable for use in the embodiment of the present invention shown in FIG. 1.
Figure 13:
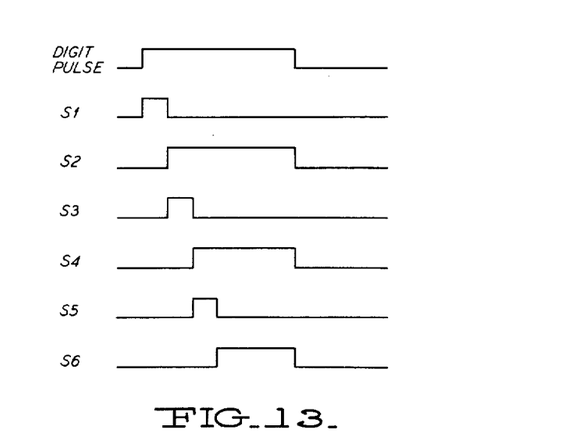
FIG. 13 is a timing chart of signals applicable to the apparatus of FIG. 12.

The input lines 171–174 are normally operatively connected to the output lines 82, 83, 84 and 81, respectively. In response to a first unmatched character data condition, these input lines will each be connected to one of the output lines in an order which corresponds to the relative magnitude standing of these first unmatched character data. Thus, if the input data along lines 171–174 during an initial unmatched condition is high, low, second high (one above low), and third high (two above low), respectively, these lines 171–174 will be latch-connected to the output lines 81–84, respectively. This condition will remain until the memory circuits within apparatuses 76–80 which are similar to that within broken line 772 of FIG. 7, are reset. If the reset timing pulse is applied to all of the apparatuses 76–80 (FIG. 12) at the end of a record block, the aforesaid input lines 171–174 will remain operatively latch-connected to the said output lines 81–84 until the end of the record block at which time a reset pulse will be applied to each of the apparatuses 76–80 to reset those particular triggers within each of these apparatuses which were turned On as a result of the initial unmatched character data condition. The timing of the application of the sample test pulses S1–S6 onto the similarly designated lines shown in FIG. 12, is shown in FIG. 13. The S1, S3, and S5 pulses are each applied to respective comparing circuits 771 (see also FIG. 7) included as a part of each apparatus 76–80 (FIG. 12), whereas the S2, S4 and S6 pulses are each applied to their respective data switching circuits 773 (FIG. 7) which are also a part of these aforesaid apparatuses 76–80 (FIG. 12).

Figure 9:
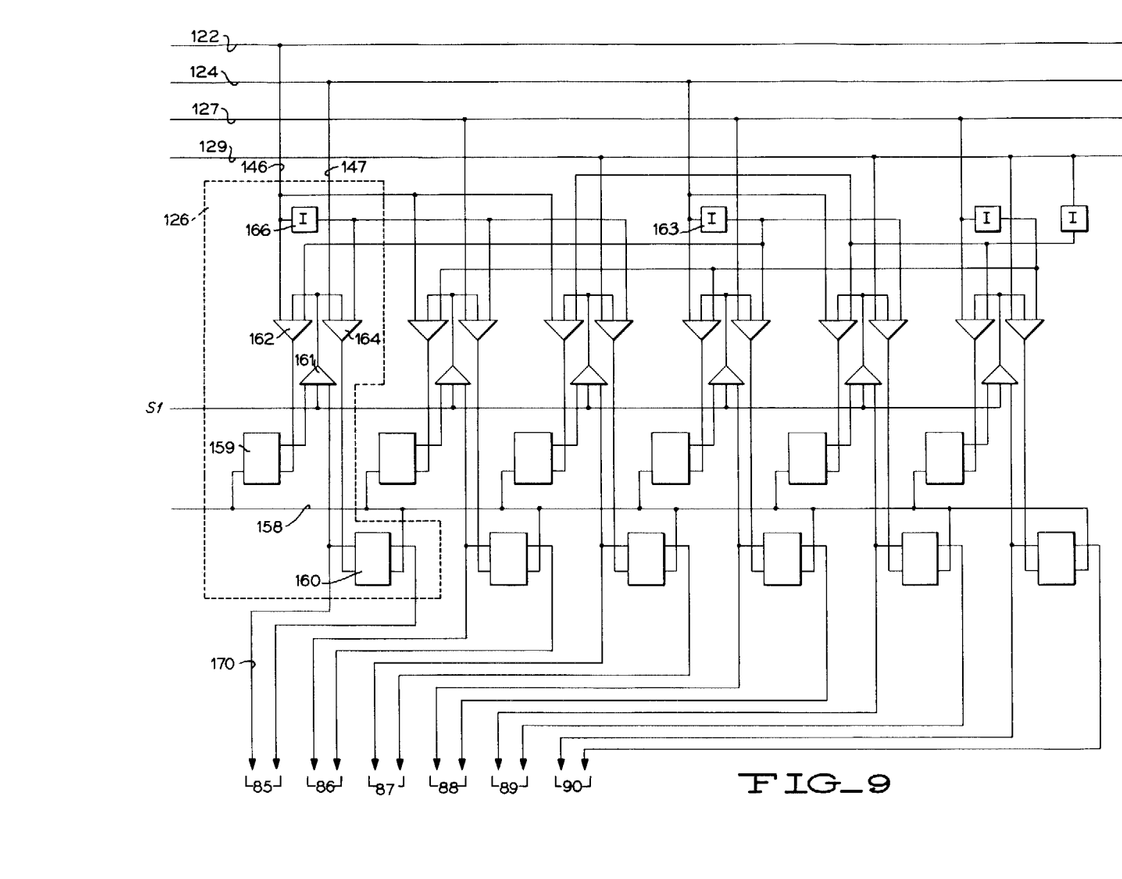
FIGS. 9–11, inclusive, taken together are a wiring diagram of the four-way data compare-sort apparatus utilized in the embodiment of the present invention shown in FIG. 1.
Figure 10:
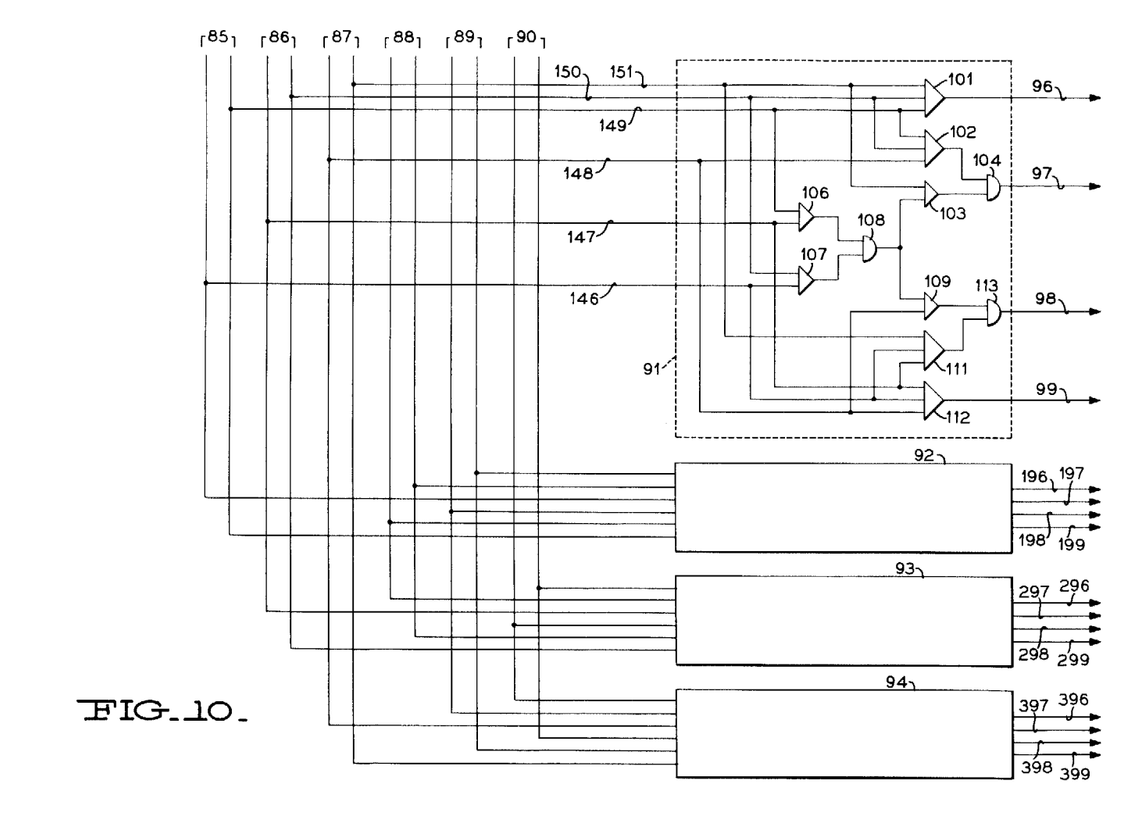
Figure 11:
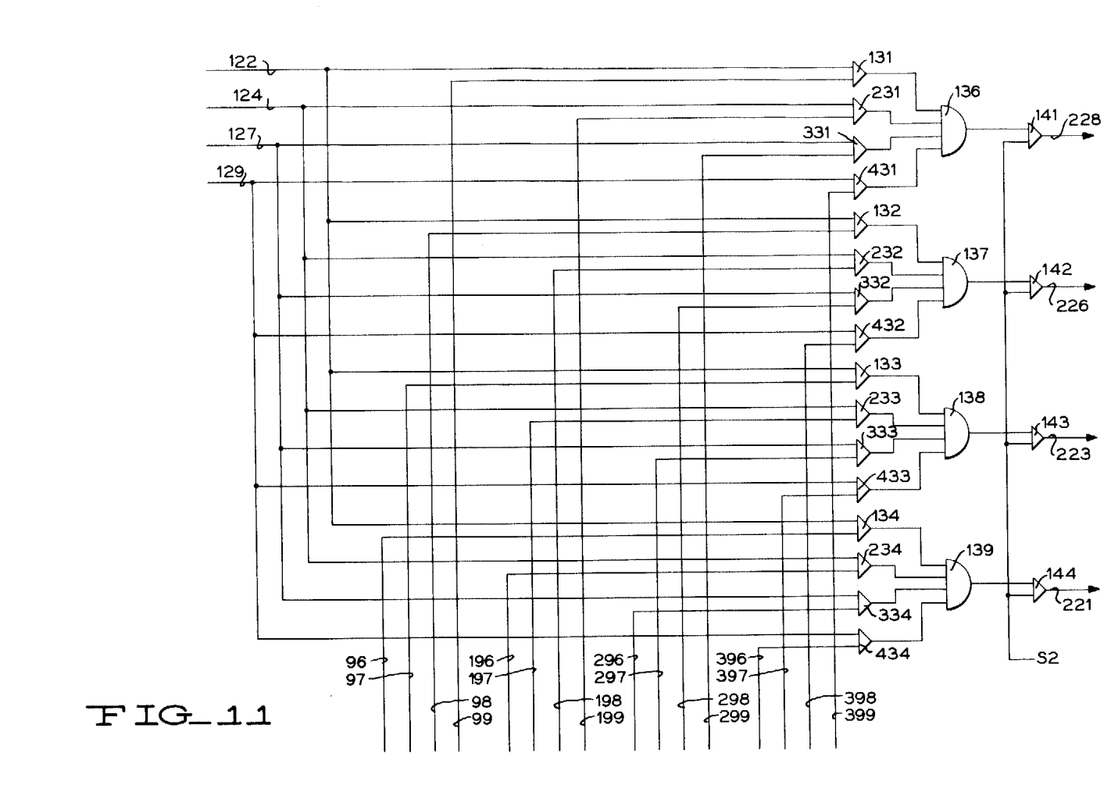

An improved four-way data compare-sort apparatus is shown in FIGS. 9–11 which, taken together, depict a four input line data compare-sort embodiment for use in the system shown in FIG. 1 hereof. This apparatus is disclosed and claimed in the copending F. Underwood patent application, Serial No. 753,442, filed on August 6, 1958. The character data input lines 122 (FIG. 9), 124, 127 and 129 may be considered to be operatively connected via the "P to S" registers 37 (FIG. 1) with the character data read devices 22, 24, 27 and 29, respectively. Thus, simultaneously provided character data signals are applied via lines 122, 124, 127 and 129 (FIG. 9) to six two-way data compare-sort apparatuses 126 each of which is similar in arrangement and operation to the apparatus shown in FIG. 7, and each of which is associated with the outputs designated by the reference numerals 85–90 (FIG. 9). The two-way data compare-sort elements of FIG. 9 which correspond to elements of FIG. 7, are identified by similar reference numerals except for the use of numbers in the one-hundred series in FIG. 9. Thus, the line 170 of output 85 (FIG. 9) which corresponds to the line 770 of FIG. 7, is normally positive so long as the triggers associated therewith are Off. This, of course, also applies to the lines associated with the other outputs 86–90. In response to either of the two-way data compare-sort input lines 146 or 147 alone having a positive pulse applied thereto to represent an initial unmatched character data condition following the application of a reset signal on line 158, the associated AND gates 162 or 164, respectively, will have a positive pulse appear at the output thereof to turn either trigger 159 or 160 On. If trigger 159 is turned On in a manner similar to setting trigger 759 (FIG. 7) On, this will so condition the AND gate 164 (FIG. 9) as to prevent the trigger 160 from being turned On until after trigger 159 has been reset Off. Accordingly, until the aforesaid trigger 159 has been turned Off, the line 170 of the first two-way data compare-sort apparatus 126 associated with the output 85, will continue to have a positive signal applied thereto. On the other hand, should the trigger 160 be turned On as a result of a positive signal appearing on the output side of AND gate 164, the AND gate 162 will be disabled since the line 170 associated with trigger 160 will go negative, and accordingly trigger 159 will be inhibited from being turned On. Furthermore, the line 169 of the output 85 will have a positive signal applied thereto until the same is reset Off.

The six two-way data compare-sort apparatuses 126 shown in FIG. 9, provide a means for comparing the correspondingly timed character datum signals on each of the input lines 122, 124, 127 and 129 with each of the character datum signals on every one of the other input lines. Thus, the apparatuses 126 associated with the outputs 85–90 afforded a means for comparing the character datum signals on the lines identified by the reference numerals 122 and 124, 122 and 127, 122 and 129, 124 and 127, 124 and 129, and 127 and 129, respectively. To restate the foregoing in another way, each of the aforesaid outputs 85–90 affords an indication of the relative magnitude of data on any one input line with respect to the data any other one input line.

The separate line-by-line character datum signal comparison results afforded along the lines of outputs 85–90 by the apparatuses 126 shown in FIG. 9, are applied to the so-called function switches 91–94 (FIG. 10). Each of these switches is a symmetric network having three pairs of inputs which are connected to three certain ones of the pairs of lines of outputs 85–90 (see also FIG. 9) that are associated with only one of the inputs 122, 124, 127 and 129. In response to the excitation of different combinations of the pairs of inputs to a symmetric network function switch, a correspondingly different output line thereof is excited, i.e., has a suitable signal applied thereto.

In order for a function switch to be symmetric, it must be possible to specify the output conditions without specific reference to the individual inputs thereto. Instead, reference must be made to the number of function switch inputs which are simultaneously excited. For example, a so-called "two-out-of-five" symmetric network function switch provides an output when, and only when, any two of the five inputs thereto are excited simultaneously. Thus, it may be stated in general, that an "$m$-out-of-$n$" symmetric network function switch has "$n$" inputs and only one output, the said output being excited when and only when any "$m$" inputs are simultaneously excited. On the other hand, a so-called full symmetric network function switch having "$n$" inputs, has "$n+1$" outputs. A signal on one of these output lines is indicative of the "zero-out-of-$n$" function, on another is indicative of the "one-out-of-$n$" function, on still another is indicative of the "two-out-of-$n$" function, etc., and on the last output line is indicative of the "$n$-out-of-$n$" function. Accordingly, it should be clear that the symmetric network function switches 91–94 (FIG. 10) are of the latter-mentioned type since each has three inputs thereto and four outputs therefrom.

*Symmetric network function—general.*—Referring to FIG. 10, the symmetric network function switch 91 is associated with those two-way data compare-sort apparatuses 126 of FIG. 9 which compare the character datum signals on input line 122 with the character datum signals on the other input lines 124, 127 and 129. That is, function switch 91 is connected to those apparatuses 126 which are associated with the input line 122. Thus, in response to the particular combination of the three pairs of input lines excited at any given time, a certain corresponding one of the outputs 96–99 of the respective symmetric network function switch will be excited to indicate the relative magnitude position of the character datum signals on line 122 with respect to the signals on the other input lines. In a similar fashion, the symmetric network function switch 92 (FIG. 10) operates to indicate the relative position of the character datum signals on input line 124 (see also FIG. 9) with respect to the correspondingly timed character datum signals on the remaining input lines 122, 127 and 129. Accordingly, the three sets of inputs to the symmetric network function switch 92 are associated with the three two-way data compare-sort apparatuses 126 of FIG. 9 which compare the character datum signals on input line 124 with those signals on each of the remaining three input lines; namely, the apparatuses that provide signals to the outputs 85, 88 and 89. In keeping with the foregoing, the symmetric network function switches 93 and 94 each provide the relative magnitude positions of the character datum signals on input lines 127 and 129, respectively, with regard to the character datum signals on the remaining input lines.

Only the symmetric network function switch 91 is shown in detail inasmuch as the other function switches 92–94 are similar in every respect thereto. Accordingly, only the circuit arrangement and operation of the symmetric function switch 91 will be described in detail.

*Operation of function switch 91 when the character data on input line 122 are equal or high.*—As a result of the character datum signal on line 122 (FIG. 9) being equal or high, the left-hand lines associated with the outputs 85–87 will be latch-connected to input line 122 to cause the application of the positive signal representing this high character datum thereto. Hence, the function switch input lines 146–148 (FIG. 10) will be excited by the positive character datum signal on line 122 (FIG. 9), and the function switch output line 99 (FIG. 10) will have a corresponding positive signal applied thereto. That is, line 99 is excited since the three inputs to AND gate 112 are each connected to the afore-mentioned positive lines. Accordingly, when the output line 99 is excited by the application of a positive signal thereto, this is an indication that the character datum signals on input line 122 are equal or high with respect to the correspondingly timed character datum signals on the other input lines 124, 127 and 129. It should be observed, however, that the signal on line 99 is no indication of the relative magnitude standings of the data on lines 124, 127 and 129. This is provided only by output signals emitted from the function switches 92–94.

So long as the triggers 160 (FIG. 9) associated with the apparatuses 126 providing outputs 85–87, are not reset Off, the left-hand lines associated with these outputs will continue to have a positive signal applied thereto. Accordingly, a positive signal will continue to be applied to the symmetric network function switch output line 99 (FIG. 10). Thus, this latter-mentioned signal on line 99 will continue to indicate that the character data on input line 122 (see also FIG. 9) are high with respect to the correspondingly timed character data appearing on the other input lines 124, 127 and 129. This afore-mentioned indication will be maintained for a predetermined period of time, e.q., the time required for a record block on tape file 11 (see also FIG. 1) to be advanced past a given character data read device, until a reset timing signal is applied to line 158 (FIG. 9) to turn off all of the triggers 159–160.

*Operation of function switch 91 when the character data on input line 122 are second high.*—For a character datum signal on input line 122 (FIG. 9) to be second high, this signal would be lower than a correspondingly timed signal on either input line 124, input line 127, or input line 129. Whichever of these preceding conditions exists, the function switch output line 98 (FIG. 10) will be excited by the application thereto of a positive signal. Thus, for example, if only the character datum on input line 129 (FIG. 9) is higher than that on input line 122, i.e., the signal on input line 122 if of a higher relative magnitude than either of the correspondingly timed character datum on the input lines 124 and 127, the AND gate 111 (FIG. 10) will cause a positive signal to be applied to output line 98 via the OR gate 113. This, of course, is due to the fact that only the lines 146, 147 and 151 are excited. On the other hand, if the character datum on only input line 127 (FIG. 9) is high with respect to the signal on input line 122, a positive signal will again be applied to the output line 98 (FIG. 10) by way of the gates 107, 108, 109 and 113. This is due to the fact that only the lines 146, 150 and 151 are excited. Finally, if the character datum signal on only input line 124 is high with respect to one on input line 122, the output line 98 will once again be excited by way of the gates 106, 108, 109 and 113 since only lines 147–149 are excited.

Thus, whenever the initial unmatched data condition with regard to input line 122 (FIG. 9) is such that the character datum signal on line 122 is third high, function switch output line 98 (FIG. 10) will have a positive signal applied thereto. This latter-mentioned positive signal will be maintained on line 98 until the triggers 159—160 (FIG. 9) associated with the outputs 85–87 are reset Off by the timing signal applied to line 158. Accordingly, should the reset signal be applied to line 158 at the end of a record block whose first character data afforded a relative magnitude comparison condition such that the data on line 122 (FIG. 9) were third high, the remaining character data within the given record block would be sorted accordingly since the function switch output line 98 (FIG. 10) would continue to be positive.

*Operation of function switch 91 when the character data on input line 122 are third high.*—Should the character datum defining signal on input line 122 (FIG. 9) be third high, this signal would be of higher relative magnitude than that on only one of the three remaining input lines 124, 127 and 129, but of a lower relative magnitude than the correspondingly timed signals on two input lines. As a result, the function switch output line 97 (FIG. 10) would be excited by the application thereto of a positive signal. Thus, should a character datum signal on input 122 (FIG. 9) be of a higher relative magnitude than only the signal applied to input line 129, the function switch output line 97 (FIG. 10) would be energized via gates 102 and 104 due to the fact that only lines 148–150 are excited. On the other hand, should the character datum signal on input line 122 (FIG. 9) be high only with respect to the correspondingly timed signal on input line 127, the output line 97 (FIG. 10) will again be excited but by way of the gates 106, 108, 103 and 104 since only lines 147, 149 and 151 would be excited. Finally, should the character datum signal on input line 122 (FIG. 9) be higher than only the signal on input line 124, the function switch output line 97 (FIG. 10) would still have a positive signal applied thereto via the gates 107, 108, 103 and 104 since only lines 146, 150 and 151 are excited. Whichever condition occurred, the output line potential would remain positive until the triggers 159–160 were reset Off by a signal on line 158.

*Operation of function switch 91 when the character data on input line 122 are low.*—As a result of a character data defining signal on input line 122 (FIG. 9) being low with respect to the correspondingly timed character datum signals on all of the three remaining input lines, the function switch output 96 (FIG. 10) alone will be energized via gate 101 by the application of a positive signal thereto. This is due to the fact that only the lines 149–151 associated with the lines of outputs 85–87, are excited.

*Summary of symmetric network function switch operation.*—In summation, if during the initial unmatched data condition the character data defining signals on input line 122 (FIG. 9) are high with respect to correspondingly timed signals on each of the remaining input lines 124, 127 and 129, the function switch output line 99 (see also FIG. 10) will be excited. This line will remain excited for all succeeding character data until a reset signal is applied on line 158 (FIG. 9). If the character data on input line 122 are high with respect to character data on any two remaining input lines but are low in comparison with the character data appearing on the remaining third input line, the function switch output line 98 (FIG. 10) will be energized. And if the character data on input line 122 (FIG. 9) are high only with respect to one other character data input lines, and are low with respect to the character data defining signals on the other remaining two character data input lines, the function switch output line 97 (FIG. 10) will be energized. Finally, if the character data defining signals on input line 122 are low with respect to those signals on all of the remaining three input lines, the function switch output line 96 will be energized.

In a similar fashion, if the character data defining signals on input line 124 (FIG. 9) are high with respect to all of the other input line character data defining signals, the function switch output line 199 (FIG. 19) will have a positive signal applied thereto. If the character data defining signals on input line 127 (FIG. 9) are high with respect to the signals on the remaining three input lines, the function switch output line 299 (FIG. 10) will have a positive signal applied thereto, whereas a positive signal on the function switch output line 399 will indicate that the character data on input line 129 (FIG. 9) are high with respect to the character data defining signals on each of the three remaining input lines.

Thus, for example, should the low to high relative magnitude standing of the initially unmatched character data be defined by the correspondingly timed signals on lines 129, 124, 122 and 127, only the function switch output lines 396 (FIG. 10), 197, 98 and 299 would be excited.

*Four-way data switching apparatus.*—Referring to FIG. 11, the serially provided character datum defining signals appearing on the input lines 122 (see also FIG. 9), 124, 127 and 129 are gated by the circuit means shown in FIG. 11 to one of the "low to high" output lines 221, 223, 226 and 228, i.e., line 221 is "LO," line 223 is "2nd HI," line 226 is "3rd HI" and line 228 is "HI." Each of these output lines is associated via respective "S to P" registers 42 (FIG. 1) and delay units 44 with a certain one of the character data write devices 21, 23, 26 and 28. Thus, for sorting purposes the character data defining signals appearing on output line 221 (FIG. 11) are considered low with respect to the character data defining signals on the remaining three input lines 223, 226 and 228, and therefore these signals are caused to be rerecorded by the character data write devices 21 (FIG. 1). Furthermore, the second high, third high and highest relative magnitude character data signals that appear on lines 223, 226 and 228, respectively, are caused to be rerecorded on the tape file 11 (FIG. 1) by their respective character data write devices 23, 26 and 28. As is shown in FIG. 11, the character data defining signals appearing on input line 122 (see also FIG. 9) are caused to appear in accordance with the initial unmatched relative magnitude result on (*a*) "HI" output line 228 via gates 131, 136 and 141; (*b*) "3rd HI" output line 226 via the gates 132, 137 and 142; (*c*) "2nd HI" output line 223 via gates 133, 138 and 142; and (*d*) "LO" output line 221 when the gates 134, 139 and 144 are conditioned for operation. In a similar fashion, the character data defining signals appearing on any of the other input lines 122, 124, 127 and 129 may be caused to appear on any one of the output lines 221, 223, 226 and 228. This, of course, is determined by the initial unmatched data condition result.

*Operation of the four-way data compare-sort apparatus.*—Let it be assumed for descriptive purposes that the character data defining signals appearing on input line 127 (FIG. 9) are high with respect to the "2nd HI" character data apearing on input line 122 which, in turn, are next high with respect to the "3rd HI" character data defining signals appearing on input line 129 which, in turn, are next high with respect to the "LO" character data signals appearing on input line 124. It should be clear that the operation of the four-way data compare-sort apparatus shown in FIGS. 9–11 must be such as to cause the input lines 127, 122, 129 and 124 to be operatively connected to the "high to low" data output lines 228, 226, 223 and 221, respectively.

The comparison of the second high character data signals appearing on input line 122 (see FIG. 9) with each of the character data defining signals on each of the other three remaining data input lines, will cause the left-hand lines of the outputs 85 and 87 to be energized, and the right-hand line of output 86 to be energized. Accordingly, the symmetric network function switch 91 (FIG. 10) will cause a positive signal to appear on only output line 98 via the gates 107, 108, 109 and 113. In a similar fashion, the function switch output lines 196, 299 and 397 will also be energized. As may be seen in FIG. 11, the energization of output line 98 will allow the transmission of the character data defining signals on input line 122 to the "2nd HI" output line 226 via gates 132, 137 and 142. The energization of the function switch output line 196 will permit the transmission of the character data defining signals appearing on input line 124 to the low output line 221 via the gates 234, 139 and 144. The input line 127 will be operatively connected to the high output line 228 as a result of the positive signals on function switch output line 299 which is connected to the input side of AND gate 331, and the positive signal on function switch output line 397 will permit the character data defining signals on input line 129 to be gated via elements 433, 138 and 143 to the third high data output line 223. Since the various triggers 159 (FIG. 9) and 160 used in the four-way data compare-sort apparatus of the system shown in FIG. 1, are reset Off only at the end of a record block, the character data signal input lines 122 (see also FIG. 9), 124, 127 and 129 will remain operatively connected to those respective output lines 221, 223, 226 and 228 as determined by the initial unmatched character data condition following a trigger reset operation, until the next trigger reset operation.

*Operation of System and Summary*

Figure 5:
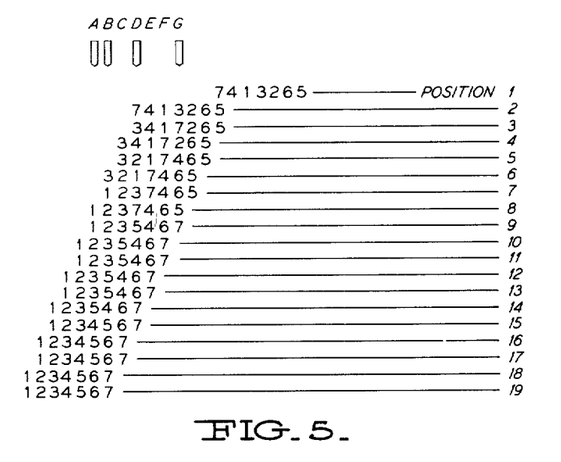

As stated previously, if a sufficient number of character data read-write devices are used to handle the character data to be sorted, the sort operation may be accomplished within a single pass of the tape file. The number of devices required to accomplish a sort within one tape file pass, is approximated by the inequality $$H \geqq \frac{1+\sqrt{8R-7}}{2}$$

wherein "H" is the least integer greater than or equal to the right-hand expression and indicates the number of heads required, and "R" is indicative of the number of records on the tape file to be sorted. Thus, for example, if a seven "R" record tape file as illustrated in FIG. 5 were to be sorted within a single tape file pass, four character data read-write devices spaced in the arithmetic progression positions A, B, D and G would be required.

*Sort operation No. 1.*—Referring to FIG. 5, a seven record block tape file identified as "7413265" is caused to be moved at a continuous rate of speed past the four, A, B, D and G character data read-write device arrangement shown. To simplify this example, each of the record blocks included within the tape file shown includes a single numeric character data. Hence, a reset timing signal must be applied to the data compare-sort memory apparatus at the end of each character data. It should be clear that the randomly arranged tape file record blocks "7413265" shown in position 1 (Pos. 1) are to be rearranged to the predetermined ascending ordered sequence "1234567" shown in Pos. 19 during a single right-to-left tape file pass. Thus, during Pos. 2 time, the character data "7" and "3" within the first and fourth record blocks, respectively, are compared and sorted as shown by the rearragement of these character data in Pos. 3. Similarly, the character data "4" and "2" within the second and fifth record blocks, respectively, are rearranged from their position in Pos. 4 to that shown in Pos. 5. When the tape file is moved to Pos. 6, the character data "3," "1" and "6" within the first, third and sixth record blocks, respectively, are compared and rearranged simultaneously, to that shown in Pos. 7 by the character data read-write devices B, D and G. A similar three-way simultaneous comparison is shown in Pos. 8, and the resulting record block rearrangement "1234567" is shown in Pos. 9. The arrangement of the record blocks shown in Pos. 9 remains the same due to the properly ordered character data read until Pos. 14 time when the fourth and fifth record blocks bearing character data "5" and "4," respectively, are are aligned with the first and second character data read-write devices A and B. Accordingly, the character data within these record blocks are rearranged to the form shown in Pos. 15, wherein all of the record blocks are in the predetermined ascending sequence "1234567."

Figure 6:
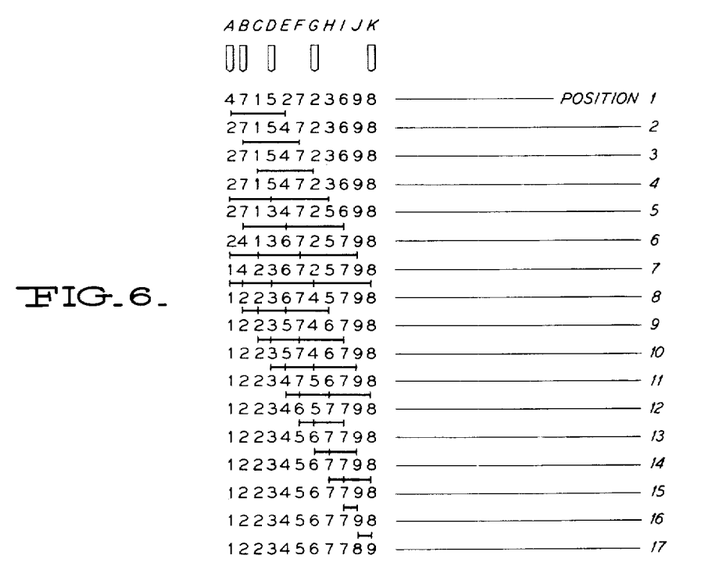

*Sort operation No. 2.*—Another example of the operation of the subject character data sorting system in which an eleven record block tape file is sorted during a single pass, is shown in FIG. 6. This tape file is moved relative to seven character data read-write devices arranged in accordance with an arithmetic progression of positions A, B, D, G and K. Referring to FIG. 6, the handling of the character data may be explained briefly as follows:

Pos. 1—the character data "4" and "2" of the first and fifth record blocks, respectively, are compared and sorted simultaneously to that shown in Pos. 2 by circuit apparatus including the read-write devices G and K.

Pos. 2—the character data "7" and "7" within the second and sixth record blocks are not rearranged since they are determined to be of equal magnitude by the apparatus including character data read-write devices G and K.

Pos. 3—the third and seventh record block character data "1" and "2," respectively, are in the correct predetermined ordered sequence, so that these data are not rearranged by their operating devices G and K.

Pos. 4—the character data "2," "5" and "3" within the first, fourth and eighth record blocks, respectively, are compared and sorted simultaneously to the desired ascending sequence by the apparatus including devices D, G and K.

Pos. 5—the second, fifth and ninth record block character data "7," "4" and "6," respectively, are handled simultaneously by apparatus including read-write devices D, G and K, so that the fifth record block character data are inserted in the second record block (see Poos. 6), whereas the second record block character data are inserted in the ninth record block. The ninth record block character data, of course, are inserted in the fifth record block position.

Pos. 6—at this time, the first, third, sixth and tenth record block character data "2," "1," "7" and "9," respectively, are handled and sorted simultaneously. Since these character data are already in the predetermined ascending ordered sequence, these data are not rearranged.

Pos. 7—at this time, a five-way data compare-sort operation takes place by the simultaneous handling of the character data "1," "4," "3," "2" and "8" in the first, second, fourth, seventh and eleventh record blocks, respectively. These data are rearranged in the order shown in Pos. 8.

Pos. 8–17—the various record block character data are handled as indicated hereinabove, while the tape file is further moved past the various character data read-write devices A, B, D, G and K. Thus, the tenth and eleventh record blocks are in operating relationship to the read-write devices A and B when the tape file is in Pos. 16. As a result, the character data "9" and "8" within these two latter-mentioned record blocks will be rearranged to the predetermined ascending ordered sequence shown in Pos. 17.

Figure 4:
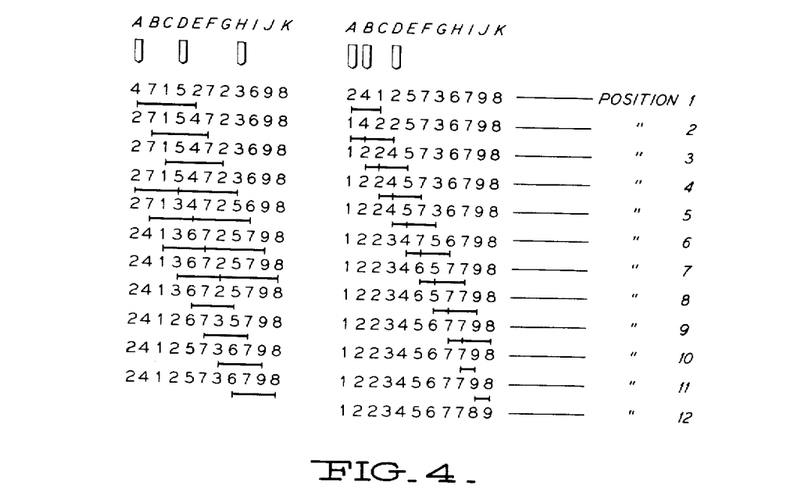
FIGS. 4–6, inclusive, depict the manner in which randomly arranged character data are handled for sorting by the present invention.

*Sort operation No. 3.*—As indicated previously, in order to accommodate those tape files which include an extremely large number of record blocks, e.g., upwards of five thousand record blocks, an extremely large number of character data read-write devices would be required and would have to be spaced in an arithmetic progression along the length of the tape file so as to accomplish a complete record block data sort operation during a single tape file pass. This does not at the present state of the art appear to be a fesible arangement since any number of character data read-write devices in excess of sixteen to twenty, for example, is undesirable. As brought out previously, if a number of heads fewer than that required by the afore-stated inequality $$H \geq \frac{1+\sqrt{8R-7}}{2}$$

for effecting a single tape file pass sort, are used, several passes of the tape file will be required. Referring to FIG. 4, it may be seen that whenever it is necessary to perform a second tape file pass relative to the character data read-write devices employed, it is necessary that these devices be rearranged after the first pass so that when they are considered collectively, their spacing is in accordance with the aforesaid arithmetic progression. Accordingly, during the first pass of the tape file in FIG. 4, it will be necessary that the last two, i.e., the furthest spaced, character data read-write devices be spaced apart in accordance with the expression $$S \geq \frac{\sqrt{8R-7}-1}{2}$$

wherein "R" represents the total number of record blocks and "S" is a whole number. Thus, if a tape file includes eleven record blocks and only three character data read-write devices as shown in FIG. 4, two tape file passes will be required to rearrange the record blocks in a predetermined ascending ordered sequence. Furthermore, it is necessary that during the first pass, the adjacent character data read-write devices D and H be spaced apart a distance defined by four record blocks. The next set of adjacent heads A and D must be set apart during this pass a distance one record block less, or three record blocks. Accordingly, as the originally recorded tape file with the randomly arranged record blocks "47152723698" thereon is moved past the character data read-write devices A, D and H, these record blocks will appear in the order "24125736798" at the end of the first tape file pass. The action that takes place is similar to that already described, and for that reason need not be repeated here.

Prior to the next tape file pass, it is necessary that the three character data read-write devices be rearranged in accordance with the arithmetic progression as initially defined during the first tape file pass. Thus, the first tape file pass adjacent devices A and D which were separated by three record block lengths, may remain in the same positions during the second tape file pass. It is necessary, however, that a character data read-write device be placed at position B. Thus, the first and second devices A and B will be sepaced apart only one record block length and the second and third devices B and C will be spaced apart two record block lengths. Thus, as the tape file shown in FIG. 4 with the record blocks "24125736798" recorded thereon in accordance with their respective positions at the end of the first tape file pass, is moved past the character data read-write devices A, B and D during the second tape file pass, these record blocks "24125736798" are rearranged to the predetermined ascending ordered sequence "12234567789" in the manner previously described. Thus, the original eleven record block tape file will have been sorted through the use of three character data read-write devices within two tape file passes, with appropriate spacings of the read-write devices for each pass.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a system having a movable nondestructible storage medium for storing a group of equal length record blocks "R" each of which includes at least one character data, the combination of "H" plurality character data reading elements as defined by the expression $$H \geq \frac{1+\sqrt{8R-7}}{2}$$

wherein "H" is the least integer equal to or greater than the right-hand term and arranged in an operating relationship to storage medium in accordance with an arithmetic progression as defined by the expression "$a$, $a+d$, $a+2d$ . . . $a+nd$," wherein the terms "$a$" and "$d$" are each representative of the integer 1 which is indicative of the equal length distances between successive record blocks, "H" plurality character data writing elements arranged in operating relationship to said storage medium in accordance with the aforesaid arithmetic progression, means for advancing said storage medium relative to said character data reading and said writing elements so that all of the character data representing all of the stored record blocks are moved relative to each of the aforesaid plurality of character data reading and writing elements, data compare-sort apparatus having "H" character data inputs thereto and "H" character data outputs therefrom for dispatching simultaneously entered character data from said inputs to said outputs so that the said character data appear simultaneously at said outputs in a predetermined ordered sequence as defined by the relative magnitude of the character data simultaneously entered, electrical means for connecting each of said "H" inputs to a respective one of said character data reading elements whereby character data read from said storage medium are entered into said data compare-sort apparatus, means for erasing the character data read into said data compare-sort apparatus, and other electrical means for connecting each of said "H" outputs to a respective one of said character data writing elements so that the character data are selectively rerecorded on said storage medium in the aforesaid predetermined ordered sequence during a single advancement of said storage medium relative to the aforesaid character data reading and writing elements.

2. In a system having a movable storage medium for sorting a group of equal length character data "R," the combination of "H" plurality character data reading elements as defined by the expression $$H \geq \frac{1+\sqrt{8R-7}}{2}$$

wherein "H" is the least integer equal to or greater than the right-hand term and arranged in an operating relationship to said storage medium in accordance with an arithmetic progression as defined by the expression "$a$, $a+d$, $a+2d$ . . . $a+nd$," wherein the terms "$a$" and "$d$" are each representative of the integer 1 which is indicative of the equal length distances between successive character data "H" plurality character data writing elements arranged in operating relationship to said storage medium in accordance with the aforesaid arithmetic progression, means for advancing said storage medium relative to said character data reading and writing elements so that all of the stored character data are moved relative to each of the aforesaid plurality of character data reading and writing elements, data compare-sort apparatus having "H" character data inputs thereto and "H" character data outputs therefrom for dispatching simultaneously entered character data from said inputs to said outputs so that the said character data appear simultaneously at said outputs in a predetermined ordered sequence as defined by the relative magnitude of the character data simultaneously entered, electrical means for connecting each of said "H" inputs to a respective one of said character data reading elements whereby character data read from said storage medium are entered into said data compare-sort apparatus, means for erasing the character data read in the said data compare-sort apparatus, and other electrical means for connecting each of said "H" outputs to a respective one of said character data writing elements so that the character data are selectively rerecorded on said storage medium in the aforesaid predetermined ordered sequence during a single advancement of said storage medium relative to the aforesaid character data reading and writing elements.

3. In a system having a movable nondestructible storage medium for sorting a group of record blocks each of which is represented by at least a single character data recorded thereon, the combination of a plurality of character data reading elements arranged in operating relationship to said storage medium and spaced in accordance with the arithmetic progression expression "$a$, $a+d$, $a+2d$ . . . $a+nd$," wherein the terms "$a$" and "$d$" are each representative of the integer 1 which is indicative of the equal length distances between successive record blocks, a corresponding plurality of character data writing elements arranged in operating relationship to said storage medium and spaced in accordance with the aforesaid arithmetic progression, means for advancing said storage medium relative to said character data reading and said writing elements so that all of the character data representing the stored record blocks are moved relative to each of the aforesaid plurality of reading and writing elements, and circuit means including a data compare-sort apparatus for operatively connecting each of said plurality of character data reading elements to a different one of said plurality of character data writing elements, to thereby dispatch simultaneously entered character data from said character data reading elements to said character data writing elements so that these character data are selectively rerecorded simultaneously on said storage medium in a predetermined ordered sequence defined by the relative magnitude of the said character data.

4. In a system having a movable nondestructive storage medium for sorting a group of equal length record blocks each of which is represented by at least a single character data recorded thereon, the combination of two character data reading elements arranged in operating relationship to said storage medium and spaced one record block length apart, two character data writing elements arranged in operating relationship to said storage medium and also spaced one record block length apart, means for advancing said storage medium relative to said character data reading and said writing elements at least once so that all of the character data representing respective record blocks re maoved relative to each of the aforesaid character data reading and writing elements, means for erasing the character data read by said character data reading elements, and circuit means including a data compare-sort apparatus for operatively connecting said two character data reading elements to said two character data writing elements to dispatch the simultaneously read character data from said character data reading elements to said character data writing elements so that these character data are selectively rerecorded on said storage medium in a predetermined ordered sequence defined by the relative magnitude of the said character data during the movement of said storage medium relative to the aforesaid character data reading and writing elements.

5. In a record block sorting system having a movable tape file for storing a group of equal length record blocks "R" each of which includes at least one character data, the combination of "H" plurality character data reading elements as defined by the expression $$H \geq \frac{1+\sqrt{8R+7}}{2}$$

wherein "H" is the least integer equal to or greater than the right-hand term and arranged in an operating relationship to said storage medium in accordance with an arithmetic progression as defined by the expression "$a$, $a+d$, $a+2d$ . . . $a+nd$," wherein the terms "$a$" and "$d$" are each representative of the integer 1 which is indicative of the equal length distances between successive record blocks, "H" plurality character data writing elements arranged in operating relationship to said storage medium in accordance with the aforesaid arithmetic progression, means for advancing said storage medium relative to said character data reading and said writing elements so that all of the character data representing all of the stored record blocks are moved relative to each of the aforesaid plurality of character data reading and writing elements, circuit means including a plurality of character data inputs and a corresponding plurality of character data outputs for dispatching simultaneously entered character data from said inputs to said outputs so that these said character data appear simultaneously at said outputs in a predetermined ordered sequence as defined by the relative magnitude of the character data, electrical means for connecting each of said inputs to a respective one of said character data reading elements and each of said outputs to a respective one of said character data writing elements, means for erasing the character data caused to be read by said character data reading elements and applied to said circuit means, latching means for modifying the operation of said circuit means when the same is operated in response to the initial detection thereby of the entry of unmatched character data from said tape file to said circuit means by causing each of said character data inputs to be connected to respective ones of said character data outputs in accordance with the manner of dispatching the unmatched character data simultaneously entered into said circuit means, and timing means for disabling said latching means after said tape file has been relatively moved one record block length, whereupon the record blocks stored on said tape file are selectively rerecorded thereon in the predetermined ordered sequence determined by the initial unmatched character data within respective record blocks.

6. In a data handling system of the class described comprising a memory for storing equal length record blocks each of which includes at least one character data, the combination of a plurality of character data reading elements spacedly arranged according to the arithmetic progression expression "$a, a+d, a+2d \ldots a+nd$" with respect to the records stored in said memory, wherein the terms "$a$" and "$d$" are each representative of the integer 1 which is indicative of the equal length distances between successive record blocks, a corresponding plurality of character data writing elements also arranged in the aforesaid arithmetic progression and in operating relationship to said memory, circuit means including a plurality of character data inputs, one for each of said plurality of character data reading elements, and a plurality of character data outputs, one for each of said plurality of character data writing elements, for dispatching simultaneously entered character data from said inputs to said outputs so that these character data appear simultaneously at said outputs in a predetermined ordered sequence as defined by the relative magnitude of the said character data, electrical means for connecting each of said inputs to a respective one of said character data reading elements and each of said outputs to a respective one of said character data writing elements, whereby the character data appearing simultaneously at said outputs are caused to be stored in said memory, latching means for modifying the operation of said circuit means when the same is operated in response to the initial detection thereby of the entry of unmatched character data from said memory to said circuit means by causing each of said character data inputs to be connected to respective ones of said character data outputs in accordance with the manner of dispatching the unmatched character data simultaneously entered into said circuit means, and timing means for disabling said latching means after said memory has been relatively moved one record block length, to thereby selectively rerecord the records in said memory in the predetermined ordered sequence.

References Cited in the file of this patent

UNITED STATES PATENTS 2,674,733     Robbins _______________ Apr. 6, 1954